United States Patent
Fu et al.

(10) Patent No.: US 8,659,825 B2
(45) Date of Patent: Feb. 25, 2014

(54) SAMPLE CARRYING APPARATUS CAPABLE OF REVOLVING SAMPLE

(71) Applicant: National Tsing Hua University, Hsinchu (TW)

(72) Inventors: Chien-Chung Fu, Hsinchu (TW); Hsiu-Ming Chang, Hsinchu (TW); Ann-Shyn Chiang, Hsinchu (TW)

(73) Assignee: National Tsing Hua University, Hsinchu (TW)

(*) Notice: Subject to any disclaimer, the term of this patent is extended or adjusted under 35 U.S.C. 154(b) by 0 days.

(21) Appl. No.: 13/669,277

(22) Filed: Nov. 5, 2012

(65) Prior Publication Data

US 2013/0063811 A1 Mar. 14, 2013

Related U.S. Application Data

(63) Continuation-in-part of application No. 12/336,365, filed on Dec. 16, 2008, now abandoned.

(30) Foreign Application Priority Data

Dec. 20, 2007 (TW) ................. 96149044 A (51) Int. Cl.
*G02B 21/26* (2006.01)
*B01L 3/00* (2006.01)
*G01N 21/00* (2006.01)
*G01N 31/00* (2006.01)
*G01N 33/00* (2006.01)

(52) U.S. Cl.
USPC ............................. 359/391; 422/503; 422/63

(58) Field of Classification Search
USPC ............................. 422/63, 102, 503; 359/391
See application file for complete search history.

(56) References Cited

U.S. PATENT DOCUMENTS

| 4,856,909 A | 8/1989 | Mehta et al. |
| 5,641,229 A | 6/1997 | McClintock et al. |

(Continued)

FOREIGN PATENT DOCUMENTS

| DE | 102007015061 A1 * | 10/2008 |
| JP | 2003007241 A | 1/2003 |
| TW | I255914 | 6/2006 |

OTHER PUBLICATIONS

Shaw et al., "Tilted view reconstruction in optical microscopy, Three-dimensional reconstruction of *Drosophilia melanogaster* embryo nuclei," Biophys. J., Jan. 1989, vol. 55, pp. 101-110.

(Continued)

*Primary Examiner* — Sam P Siefke
*Assistant Examiner* — Bryan Kilpatrick
(74) *Attorney, Agent, or Firm* — Muncy, Geissler, Olds & Lowe, P.C.

(57) ABSTRACT

An apparatus adapted to a microscope includes a body, a revolvable structure, a stage and a driving device. The body has a slot for holding a liquid to form a horizontally level surface of the liquid. The revolvable structure partially accommodated within the slot and pivotally connected to the body is revolvable relative to the body about a horizontal axis and is for supporting a sample, which is immersed in the liquid. The revolvable structure penetrates through the body in a horizontal direction substantially parallel to the horizontal axis and is pivotally engaged to the body through a sealing ring, which makes the liquid be held in the slot and stops the liquid from leaking in the horizontal direction. The stage supports the body. The driving device is disposed on the stage and connected to the revolvable structure to revolve the revolvable structure.

14 Claims, 6 Drawing Sheets

(56) References Cited

U.S. PATENT DOCUMENTS

| | | |
|---|---|---|
| 6,472,216 B1 | 10/2002 | Chiang |
| 6,723,650 B1 | 4/2004 | Chang |
| 6,929,782 B1 | 8/2005 | Ciliberto et al. |
| 6,962,674 B2 | 11/2005 | Dean et al. |
| 2003/0102867 A1 | 6/2003 | Hioka |
| 2010/0067104 A1* | 3/2010 | Lippert et al. ............ 359/391 |

OTHER PUBLICATIONS

Bhattacharya, Anand et al., "Precision sample rotator with active angular position readout for a superconducting quantum interference device susceptometer," Rev. Sci. Instrum., vol. 69, No. 10, Oct. 1998, pp. 3563-3567.

* cited by examiner

SAMPLE CARRYING APPARATUS CAPABLE OF REVOLVING SAMPLE

This application is a Continuation-in-Part of application Ser. No. 12/336,365, filed on Sep. 16, 2008 and now abandoned, and for which priority is claimed under 35 U.S.C. §120; and this application claims priority of No. 096149044 filed in Taiwan, R.O.C. on Dec. 20, 2007 under 35 USC 119, the entire content of which is hereby incorporated by reference.

BACKGROUND OF THE INVENTION

1. Field of the Invention

The invention relates in general to a sample carrying apparatus, and more particularly to a sample carrying apparatus capable of revolving a sample.

2. Related Art

Confocal laser scanning microscopy (CLSM or LSCM) is a valuable tool for obtaining high resolution images and 3-D reconstructions by using a spatial pinhole to eliminate out-of-focus light or flare. This technology permits one to obtain images of various Z-axis planes (Z-stacks) of the sample. The detected light originating from an illuminated volume element within the specimen represents one pixel in the resulting image. As the laser scans over the plane of interest, a whole image is obtained pixel by pixel and line by line. The beam is scanned across the sample in the horizontal plane using one or more (servo-controlled) oscillating mirrors. Information can be collected from different focal planes by raising or lowering the microscope stage. The computer can calculate and then generate a three-dimensional picture of the specimen by assembling a stack of these two-dimensional images from successive focal planes.

However, the Z-axis direction in the stacked 3D image has a much poor resolution (e.g., about 1.2 μm/slice) than in the X-axis and Y-axis directions (about 0.15 μm/pixel) under the limitation of the dimension of the pinhole and other mechanical or physical properties. A poor resolved Z-axis direction hampers the spatial reliability of the high resolution neural network images reconstructed, especially when comparison of two different samples is necessary. One of the inventors, Ann-Shyn Chiang, has disclosed an aqueous tissue clearing solution in U.S. Pat. No. 6,472,216 B1. In the '216 patent, the depth of observation may reach the level of micrometers. In the current developing method, fluorescent molecules are attached to or combined with the biological tissue. Thus, making the tissue become transparent is a key point for the break-through of the depth of observation, and the way of solving the bottleneck of the Z-axis resolution is greatly needed.

Thus, it is an important subject of the invention to provide a sample carrying apparatus capable of revolving the sample.

SUMMARY OF THE INVENTION

It is therefore an object of the invention to provide a sample carrying apparatus capable of revolving a sample so that the resolution of 3D image sensing can be increased.

The invention achieves the above-identified object by providing an apparatus placed under a microscope includes a body, a revolvable structure, a stage and a driving device. The body has a slot for holding a liquid to form a horizontally level surface of the liquid. The revolvable structure partially accommodated within the slot and pivotally connected to the body is revolvable relative to the body about a horizontal axis and is for supporting a sample, which is immersed in the liquid. The revolvable structure penetrates through the body in a horizontal direction substantially parallel to the horizontal axis with its pivot engaged to the body through a sealing ring, which makes the liquid be held in the slot and prevents the liquid from leaking at the pivot. The stage supports the body. The driving device is disposed on the stage and connected to the revolvable structure to revolve the revolvable structure. The sample-carrying revolving structure thus may revolve to predetermined angles within liquid.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

The present inventors have tried to revolve a sample by a specific angle about the X axis or the Y axis, and then to solve the problem of the too-low resolution along the Z axis by way of image processing and synthesizing. In order to achieve this effect, a sample carrying apparatus for carrying the sample has to be configured into a revolvable one. In addition, part of the sample carrying apparatus has to be merged in a liquid, such as the saline solution or other solutions capable of making the biometrics organization of the sample transparent and physiologically relevant. The detailed structure of the sample carrying apparatus of the invention will be described in the following.

Figure 1:
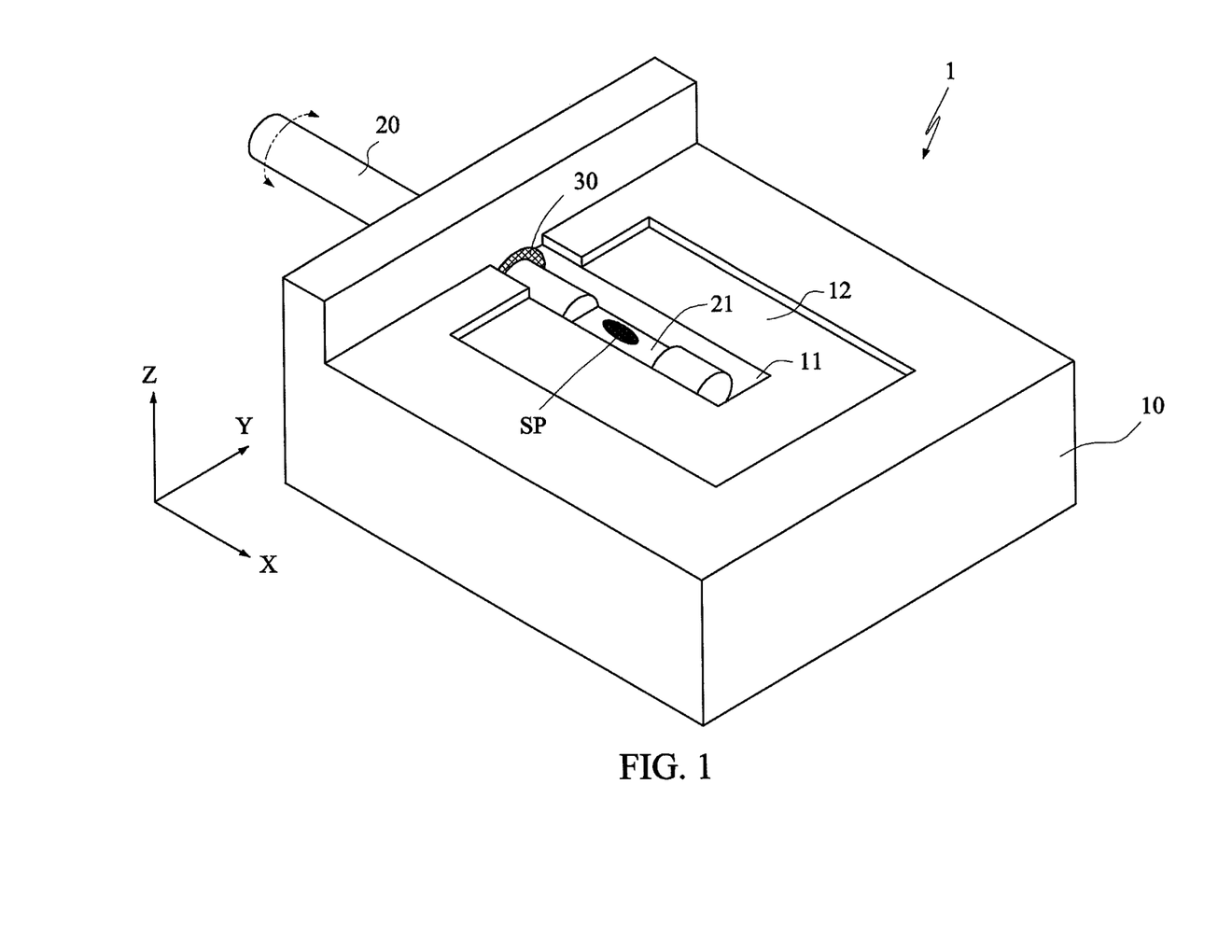
FIG. 1 is a schematic illustration showing a sample carrying apparatus according to a first embodiment of the invention.

FIG. 1 is a schematic illustration showing a sample carrying apparatus 1 according to a first embodiment of the invention. Referring to FIG. 1, the sample carrying apparatus 1 includes a body 10 and one revolvable structure 20 or a plurality of revolvable structures. The body 10 has an L-shaped cross-sectional area (see FIG. 2A). The body 10 has one slot 11 or a plurality of slots. The revolvable structure 20 partially accommodated within the slot 11 is pivotally connected to the body 10 and is revolvable relative to the body 10 about the X axis, which is also referred to a horizontal axis. The revolvable structure 20 penetrates through the body 10 in a horizontal direction substantially parallel to the X axis. The body 10 is placed on the X-Y plane.

In this embodiment, the revolvable structure 20 is a rod-like structure, such as a cylinder. However, the invention is not particularly restricted thereto. The revolvable structure 20 may also have a rectangular, elliptical, or hexagonal cross-section area on the Y-Z plane, and may also have multiple segments with different shapes of cross-section areas. The rod-like structure has one plane 21 or a plurality of planes for supporting the sample SP. In order to immerse the sample SP in the liquid, such as a saline solution or a specific solution capable of making the sample SP become transparent, the revolvable structure 20 is pivotally engaged to the body 10 through a sealing ring 30, which makes the liquid be held in the slot 11.

In order to seal the sample SP on the revolvable structure 20, the body 10 may have a concave portion 12 through which the slot 11 is plowed. In other words, the liquid may spill from the slot 11 to the concave portion 12 and provide a better coverage of the sample in an aqueous environment. The concave portion 12 may position and support a piece of cover glass 40 covering the liquid and the sample.

Figure 2A:
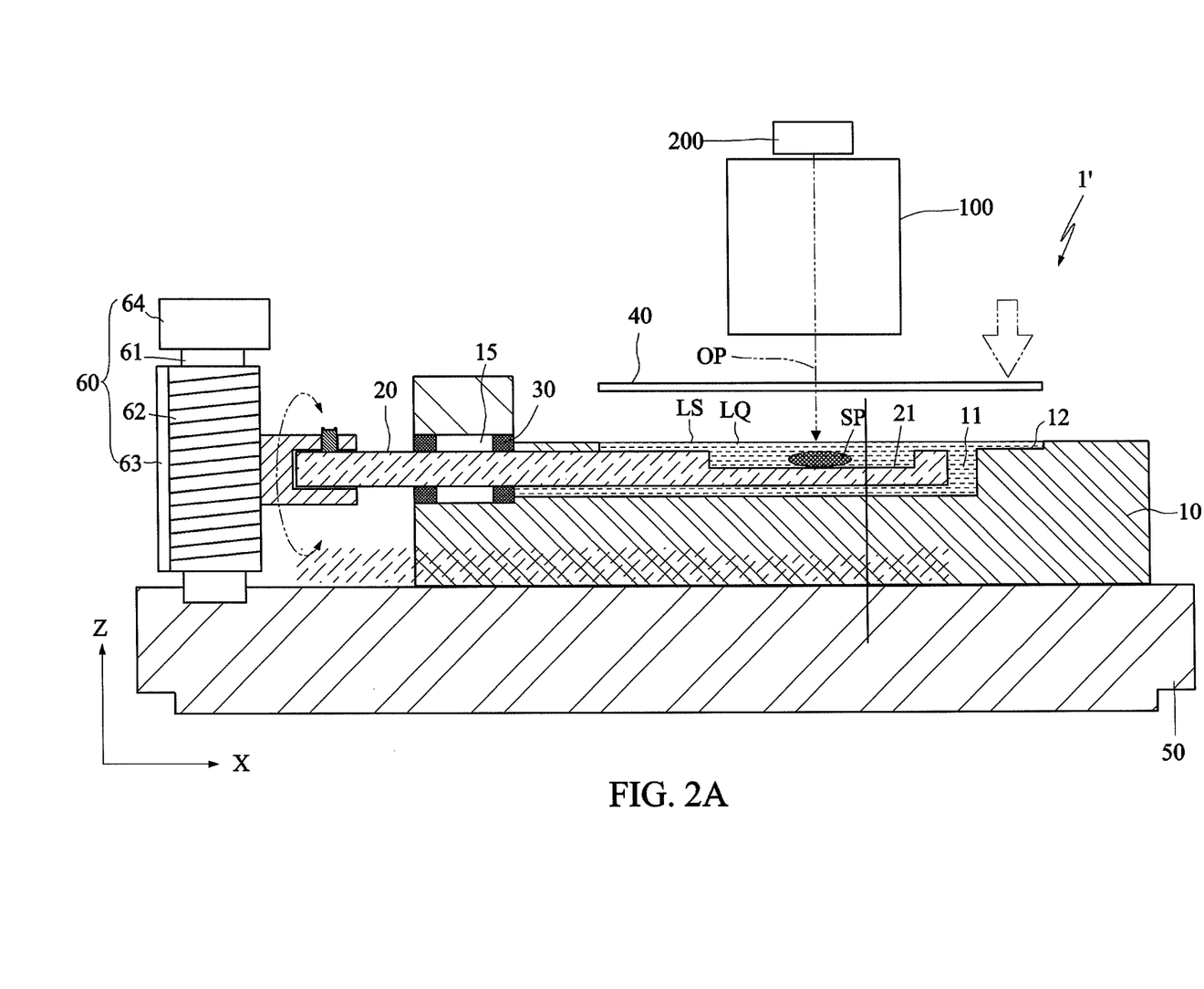
FIG. 2A is a front view showing a sample carrying apparatus according to a second embodiment of the invention.
Figure 2B:
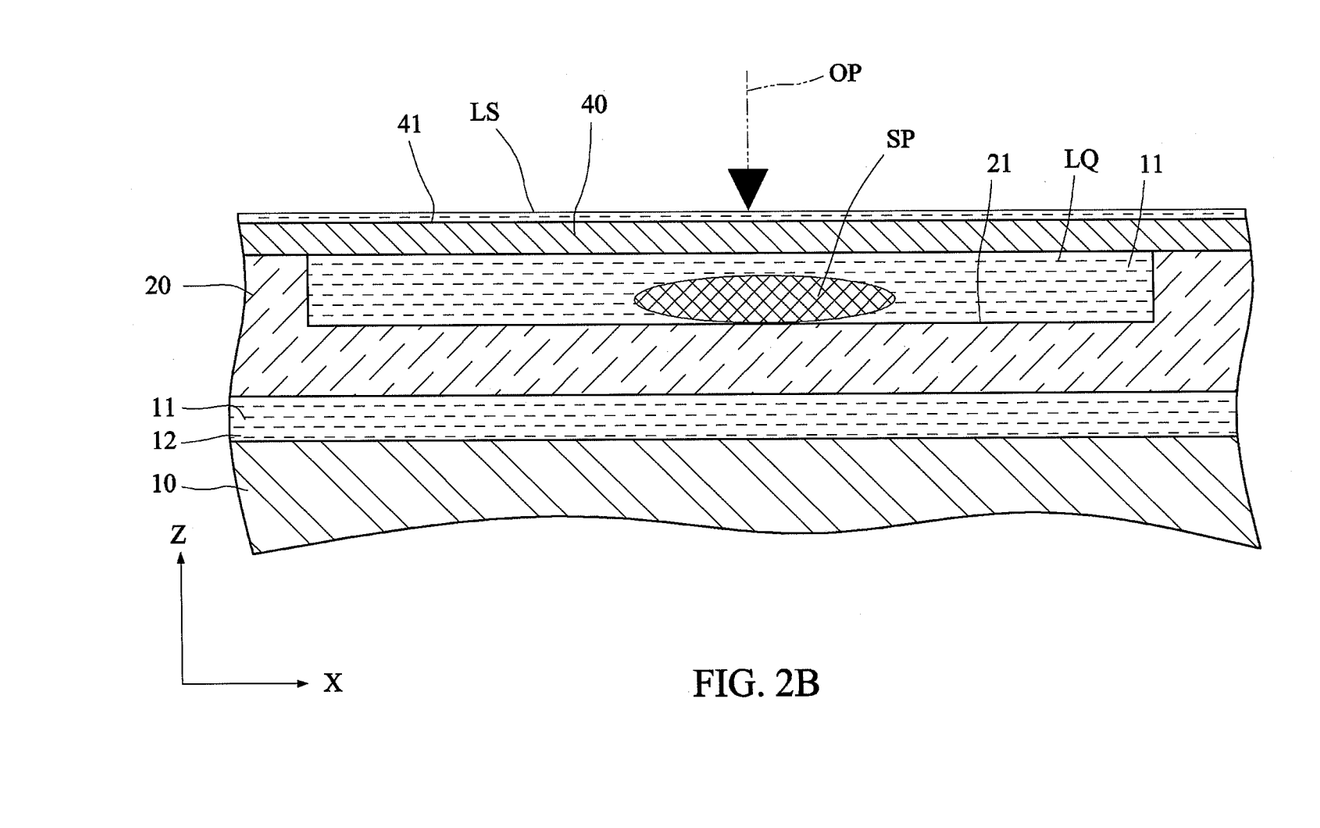
FIG. 2B is a partially enlarged view showing the sample carrying apparatus according to the second embodiment of the invention.
Figure 3:
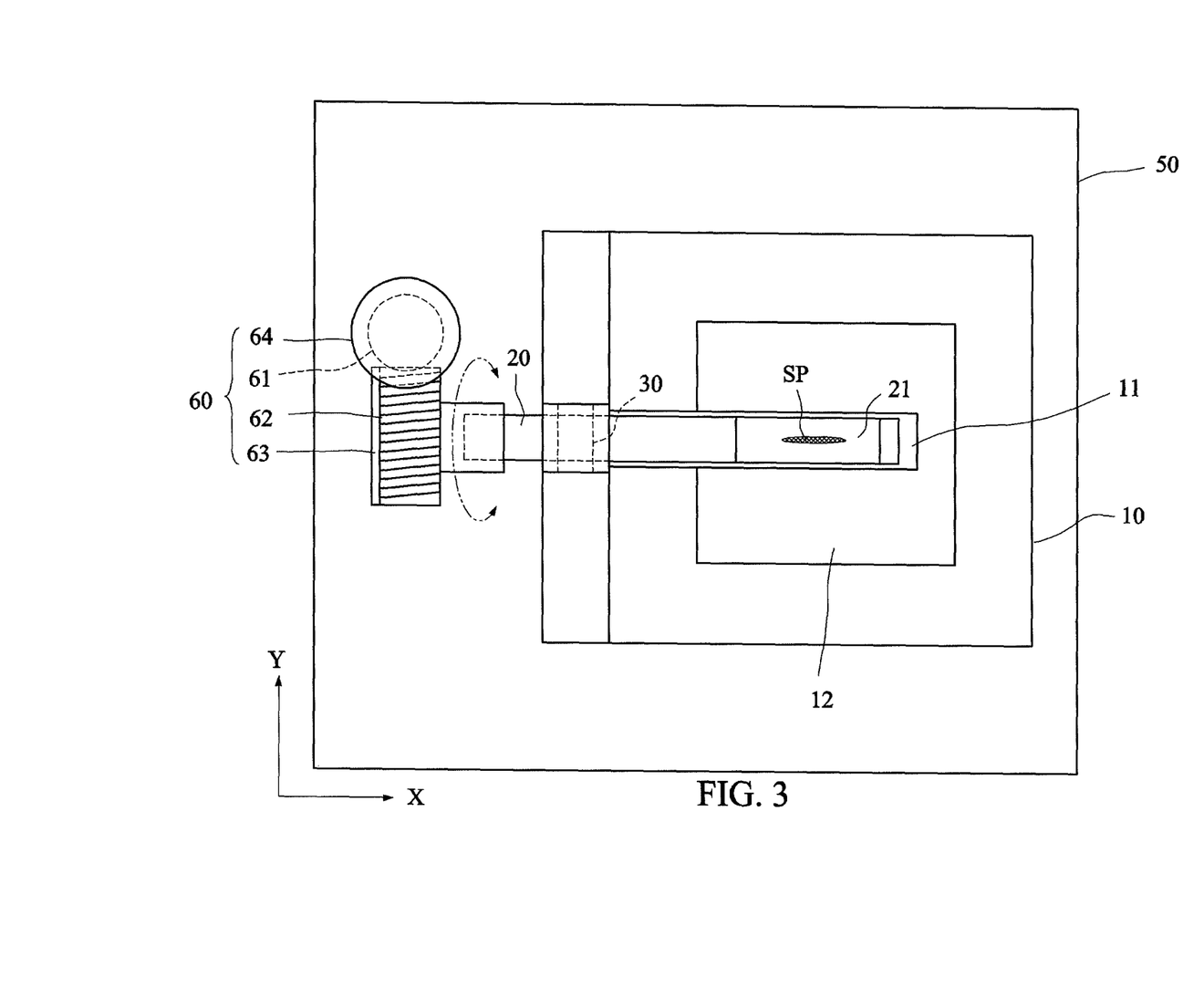
FIG. 3 is a top view showing the sample carrying apparatus according to the second embodiment of the invention.

FIG. 2A is a front view showing a sample carrying apparatus 1' according to a second embodiment of the invention. FIG. 2B is a partially enlarged view showing the sample carrying apparatus 1' according to the second embodiment of the invention. FIG. 3 is a top view showing the sample carrying apparatus 1' according to the second embodiment of the invention. As shown in FIGS. 2A, 2B and 3, the sample carrying apparatus 1' of this embodiment adapted to a microscope 100 is similar to that of the first embodiment except that the sample carrying apparatus 1' further includes a stage 50 and a driving device 60. Since the drawings are only for the illustration purpose only, the sizes of the elements are not drawn according to the predetermined scale. In other words, the microscope 100 may be much larger than the body 10. The microscope 100 for observation may also be regarded as a part of the sample carrying apparatus 1' and may also be regarded as a part independent from the sample carrying apparatus 1'. In this embodiment, the microscope 100 includes, but without limitation to, a microscope adapted to confocal laser scanning microscopy (CLSM or LSCM) for obtaining high-resolution optical images with depth selectivity; an optical microscope; or an electron microscope, such as a transmission electron microscope or a scanning electron microscope. The stage 50 supports the body 10 and may be a portion of the microscope 100. The driving device 60 is disposed on the stage 50 and is connected to the revolvable structure 20 to revolve the revolvable structure 20. The driving device 60 may be a motor (see FIG. 4A to be described later).

As shown in FIGS. 2A and 2B, the slot 11 holds the liquid LQ, which is capable of making the sample SP become transparent and physiologically relevent, forming a horizontally level surface LS of the liquid LQ. The revolvable structure 20 is revolvable relative to the body 10 about the horizontal axis (X-axis). The body 10 has a through hole 15, which extends in the X-axis direction and reaches the slot 11. The revolvable structure 20 is partially accommodated within the through hole 15, and the sealing ring 30 is engaged within the through hole 15 and disposed between the revolvable structure 20 and the body 10. Thus, the revolvable structure 20 accommodated in the slot 11 penetrates the body 10 through the through hole 15 of the body 10 in the horizontal direction substantially parallel to the rotation axis (horizontal axis). In addition, the sealing ring 30 makes the liquid LQ be held in the slot 11 and stops the liquid LQ from leaking through the through hole 15 in the horizontal direction. Since the liquid LQ is held in the slot 11, the revolvable structure 20 is configured such that an optical path OP from the microscope 100 to the sample SP is substantially perpendicular to the horizontally level surface LS of the liquid LQ, and the undesired effect of refraction may be eliminated. In order avoid the sample SP from being compressed and distorted to affect the observation, a piece of cover glass 40 is not in direct contact with the sample SP when being positioned and supported by the concave portion 12, as shown in FIG. 2B. In this embodiment, the concave portion 12 may position and support the piece of cover glass 40 covering the liquid LQ and the sample SP. The piece of cover glass 40 may also be regarded as a part of the apparatus 1'. As shown in FIG. 2A, the cover glass 40 will be placed on the body 10 in the direction indicated by the arrow. As shown in FIG. 2B, the cover glass 40 is placed under the horizontally level surface LS. In another example, the horizontal levelly surface LS may be controlled to be lower than the top surface 41 of the cover glass 40. In this embodiment, the apparatus 1' may further include a camera 200, which captures an image of the sample SP through the microscope 100. When the sample SP is revolved to predetermined angles, various images of the sample may be captured and then processed so that the resolution of 3D image sensing can be increased.

In this embodiment, the driving device 60 includes a worm shaft 61 and a worm wheel 62, which is engaged with the worm shaft 61 and is revolved by the worm shaft 61. In order to make the user revolve the worm shaft 61 easily, the driving device 60 may further include a knob 64 fixed to the worm shaft 61, wherein the user may revolve the knob to revolve the worm wheel 62, and then the revolvable structure 20 can be fixed at the revolved angle, at which the image of the sample SP on the revolvable structure 20 is observed or obtained through the microscope 100. In order to let the user know the revolving angle of the revolvable structure 20, the driving device 60 may further include a cover 63, which is fixed to the worm wheel 62 and is formed with indexes.

Figure 4A:
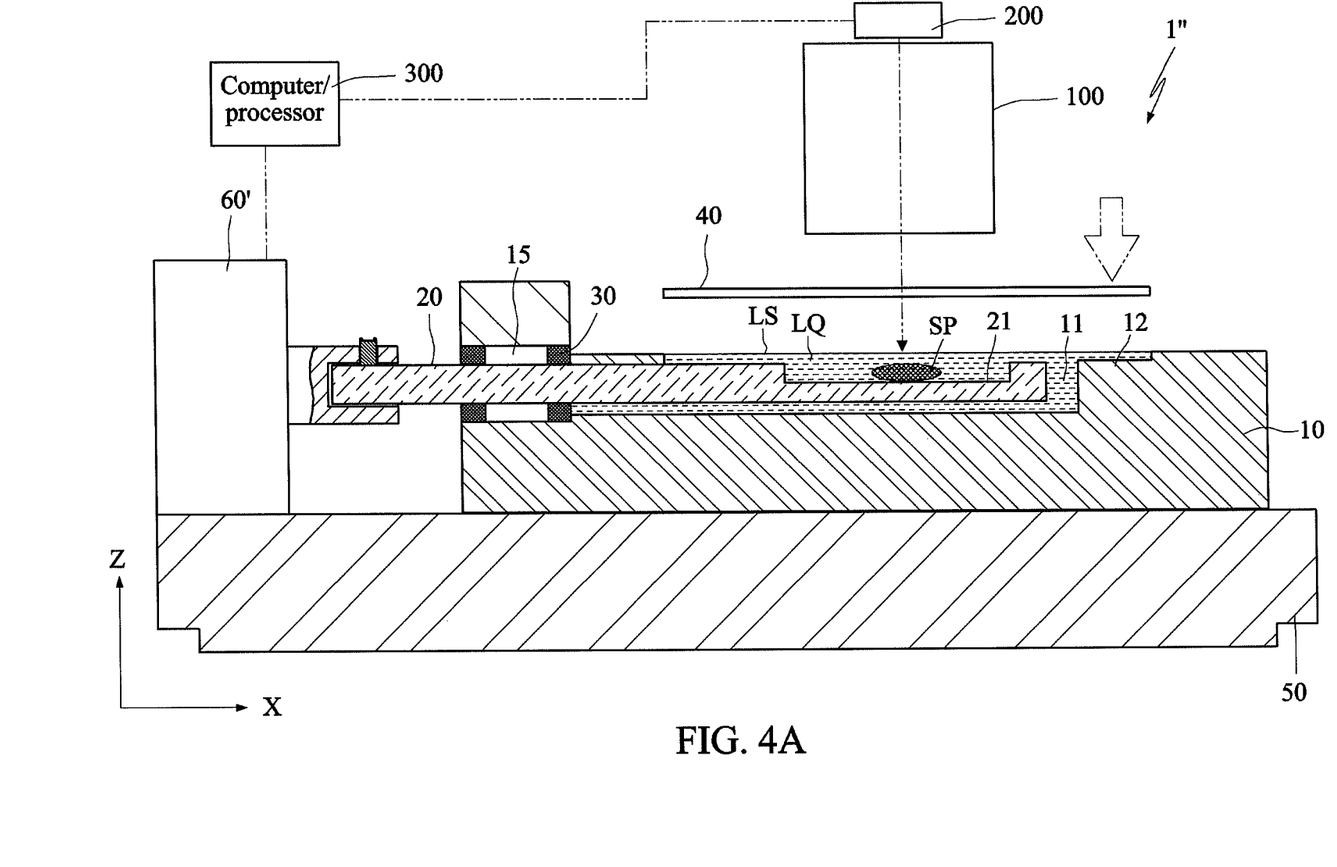
FIG. 4A is a front view showing a sample carrying apparatus according to a third embodiment of the invention.

FIG. 4A is a front view showing a sample carrying apparatus 1'' according to a third embodiment of the invention. As shown in FIG. 4A, this embodiment is similar to the second embodiment except that a motor 60' serving as the driving device for revolving the revolvable structure 20 is provided. The motor 60' is mounted on the stage 50 and can revolve and fix the revolvable structure 20 at the predetermined angles so that various images of the sample may be captured. In this manner, the motor 60' and the camera 200 can be controlled by a computer or processor 300 and the images of the sample SP at different angles may be correctly and conveniently recorded and then processed by the computer or processor 300.

Figure 4B:
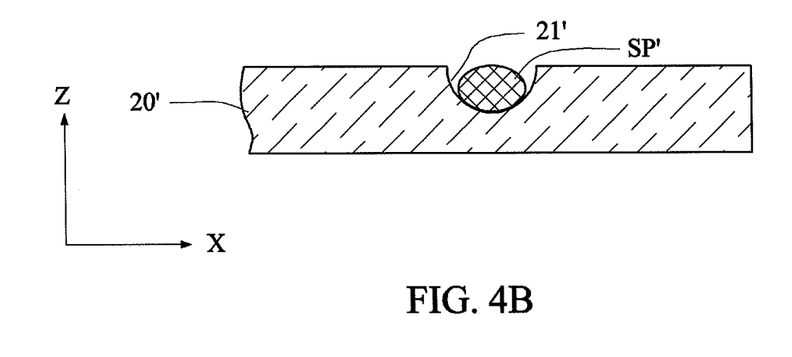
FIG. 4B is a partial view showing another example of a revolvable structure according to the third embodiment of the invention.

FIG. 4B is a partial view showing another example of a revolvable structure 20' according to the third embodiment of the invention. As shown in FIG. 4B, the revolvable structure 20' has a recess 21' for accommodating the sample SP'. The recess 21' has the form of a semi-sphere in this example, and may have the form of a semi-elliptical sphere in another example. The sample SP' may be fully or partially accommodated within the recess 21'. In this manner, the sample SP' may be held by the revolvable structure 20' more stably. In one example, the revolvable structure 20' is made of a transparent material for allowing light to enter the sample SP from various positions. In another example, however, the revolvable structure 20' is made of a non-transparent material for preventing the environment light from affecting the observation of the sample.

According to the sample carrying apparatus of the invention, the sample may be revolved. Thus, it is possible to reconstruct a three-dimensional object with high resolutions in three primary axes according to many stacks of images obtained at various revolving angles of the sample, wherein the revolving angles may be different from one another or each other by 90 degrees, for example. Thus, the resolutions may be increased, or other diversified image sensing functions may be achieved. In addition, the sample may be immersed in the liquid so that various sensing conditions may be satisfied.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. An apparatus adapted to a microscope, the apparatus comprising:
    a body having a slot for holding a liquid to form a horizontally level surface of the liquid;
    a revolvable structure, which is partially accommodated within the slot, is pivotally connected to the body and is revolvable relative to the body about a horizontal axis, wherein the revolvable structure is for supporting a sample in the liquid, the revolvable structure is inserted through a hole of the body in a horizontal direction substantially parallel to the horizontal axis and is pivotally engaged to the body through a sealing ring, and the sealing ring makes the liquid be held in the slot and stops the liquid from leaking through the hole in the horizontal direction;
    a stage, which supports the body; and
    a driving device, which is disposed on the stage and is connected to the revolvable structure to revolve the revolvable structure.

2. The apparatus according to claim 1, wherein the revolvable structure is configured such that an optical path from the microscope to the sample is substantially perpendicular to the horizontally level surface of the liquid.

3. The apparatus according to claim 1, wherein the revolvable structure is a rod-like structure having one plane for supporting the sample.

4. The apparatus according to claim 1, further comprising a piece of cover glass, wherein the body has a concave portion for positioning and supporting the piece of cover glass covering the liquid and the sample, and the slot is plowed through the concave portion.

5. The apparatus according to claim 4, wherein the piece of cover glass is not in direct contact with the sample when being positioned and supported by the concave portion.

6. The apparatus according to claim 1, wherein the body has an L-shaped cross-sectional area.

7. The apparatus according to claim 1, wherein the revolvable structure has a recess for accommodating the sample.

8. The apparatus according to claim 7, wherein the driving device comprises a motor.

9. The apparatus according to claim 7, wherein the driving device comprises:
    a worm shaft; and
    a worm wheel, which is engaged with the worm shaft and is revolved by the worm shaft.

10. The apparatus according to claim 9, wherein the driving device further comprises:
    a cover, which is fixed to the worm wheel and is formed with indexes.

11. The apparatus according to claim 9, wherein the driving device further comprises:
    a knob, which is fixed to the worm shaft and is revolvable by a user to drive the worm shaft.

12. The apparatus according to claim 1, further comprising the microscope for observation.

13. The apparatus according to claim 12, further comprising a camera, which captures images of the sample through the microscope.

14. The apparatus according to claim 1, wherein the revolvable structure is made of a transparent material.

* * * * *